Feb. 23, 1971 TASUKU YUKI ET AL 3,566,313
WAVE FILTER OF THE COMPLEX FORK TYPE
Filed May 22, 1968

INVENTORS
TASUKU YUKI
TAKAYUKI KAWANA
BY
Hopgood & Calimafde
ATTORNEYS 3,566,313

WAVE FILTER OF THE COMPLEX FORK TYPE

Tasuku Yuki and Takayuki Kawana, Tokyo-to, Japan, assignors to Nippon Electric Company, Limited, Tokyo-to, Japan Filed May 22, 1968, Ser. No. 731,174
Claims priority, application Japan, May 29, 1967, 42/34,325
Int. Cl. H03h 9/00
U.S. Cl. 333—72 2 Claims

ABSTRACT OF THE DISCLOSURE

A wave filter is described wherein a complex tuning fork structure is formed by pairs of cantilever mounted resonating plates mounted to a base. At least two pair of resonating plates are provided which resonate respectively at the same frequency but with opposite phase. The plates are driven by transducer elements selectively affixed to the plates with similar transducers used to detect the complex wave vibrations induced in the structure to provide an electrical signal which is attenuated according to the pass band response of the filter.

This invention relates to a wave filter of the complex fork type. More specifically, this invention relates to a wave filter of the complex fork type wherein an electrostrictive ceramic is used as an electromechanical transducer element.

Recently the complex fork type wave filter has become widely used as a receiving wave filter for the paging systems of mobile radio stations, such as operated in trains, aircraft, and so forth. A reduction in the size and improved reliability have become special requirements for the wave filters of this type. It is therefore the principal object of this invention to provide a small, highly reliable wave filter of the complex fork type.

The above-mentioned and other features and objects of this invention and the manner of attaining them will become more apparent and the invention itself will best be understood by reference to the following description of embodiments of the invention taken in conjunction with the accompanying drawings, wherein.

Briefly stated, this invention contemplates a fork type wave filter, in which more than a pair of even-numbered resonant plates or more than four plates are disposed on a base in such a manner that the resonant plates are arranged facing each other.

The invention will be specifically explained by referring to the appended drawings.

Figure 1:
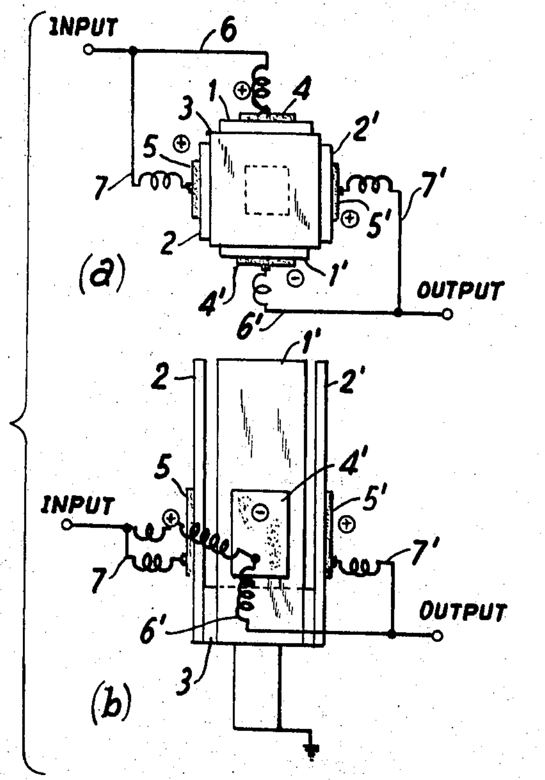
FIG. 1 is a structural diagram showing a wave filter of complex fork type according to this invention.

FIGS. 1(*a*) and 1(*b*) are respectively a top view and a front elevation view, showing the structure of an embodiment of this invention. The reference numerals 1, 1′, 2 and 2′ indicate two pairs of resonate plates fixed by soldering or other suitable means to the sides of a base 3 on which a metallic mechanical vibrating body is mounted. Base 3 vibrates in coupling relationship with the resonating plates and is not rigid. Electromechanical transducer elements 4, 4′, 5 and 5′ fixed to the bottom of the respective resonant plates. Lead wires 6, and 7 are respectively coupled between transducer elements 4 and 5 and an input terminal, and lead wires 6′ and 7′ are respectively coupled between transducer elements 4′ and 5′ and an output terminal. When an electric input signal is applied to lead wires 6 and 7, this signal voltage is given to the elements 4 and 5, whereby the electric energy is converted into a mechanical energy by virtue of the piezoelectric effect. Accordingly, the base 3 of the metallic mechanical vibrating body is vibrated as a complex fork in combination with the resonant plates 1 and 1′, or 2 and 2′. The output signal is converted into an electric signal by the electromechanical transducer element plates 4′ and 5′ affixed to the resonant plates 1′ and 2′ respectively. This electric energy is taken out through lead wires 6′ and 7′ to be delivered to an external output circuit.

Figure 2:
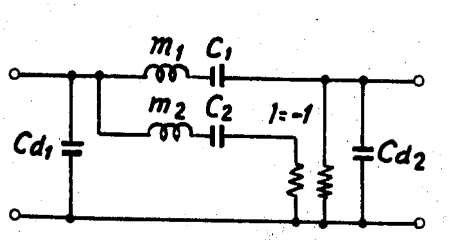
FIG. 2 is an equivalent circuit diagram of the wave filter as in FIG. 1.

FIG. 2 is the equivalent circuit of the mechanical filter of FIG. 1. The electromechanical transducer elements are affixed to the resonant plates 1 and 1′, and 2 and 2′ so that plates 1 and 1′ are made in phase, while 2 and 2′ are out of phase. This circuit is expressed as a Jaumann type circuit where $m_1$ and $m_2$ are the equivalent masses of the resonate plates $c_1$ and $c_2$ are the equivalent compliances, and $cd_1$ and $cd_2$ are the capacitances of the electromechanical transducer elements.

Figures 3, 4:
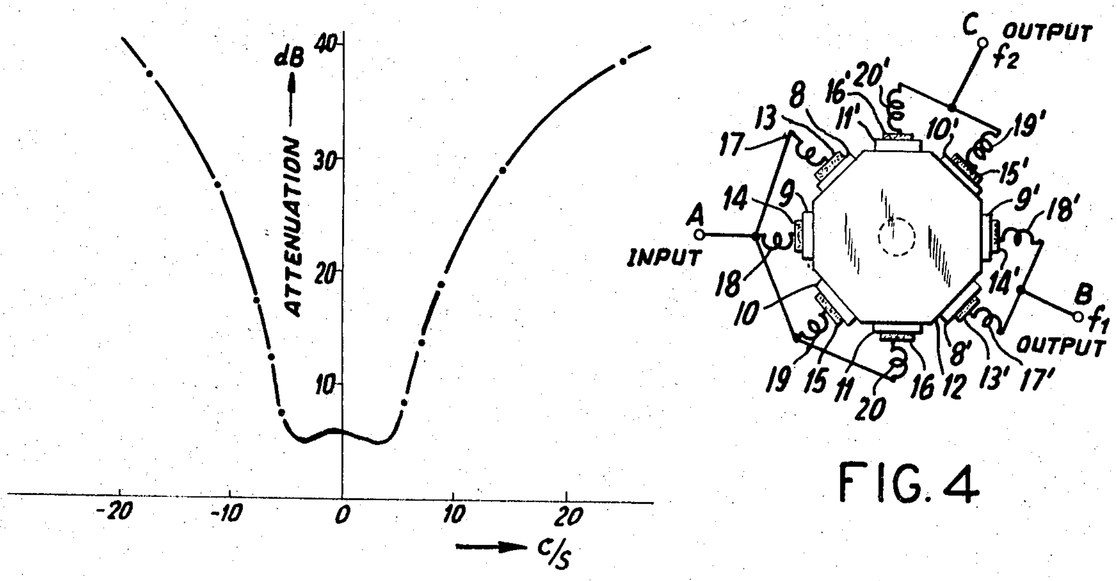
FIG. 3 is its characteristic curve.
FIG. 4 is a top view of a multiple element formed according to this invention.

FIG. 3 shows the operating characteristic of the complex fork type wave filter of FIG. 1. According to this wave filter, the pass band is wide and the attenuation characteristic is steep, in comparison with the case of a single element.

FIG. 4 is a top view of multiple element formation of the complex fork wave filter according to this invention, to accomplish two-frequency division.

This is constructed in such manner that the operating characteristic as shown in FIG. 3 with a center frequency $f_1$ is obtained when an input signal is applied to input leads 17, 18 and an output signal is derived from output leads 17′, 18′, and the same operating characteristic but with a center frequency $f_2$ is obtained when an input signal is applied to input leads 19, 20 and an output signal is derived from output leads 19′, 20′. Then, the input leads 17, 18, 19 and 20 are connected to form one input terminal (A), whereby in response to an input signal applied to the input terminal (A) output signals having center frequencies $f_1$ and $f_2$ are derived from output terminals (B) and (C), respectively. Thus, the complex fork wave filter (multiple formation) of two frequency division is obtained.

Resonant plates 8, 8′, 9, 9′, 10, 10′, 11 and 11′ are fixed to the sides of a base 12 of metallic vibrating body in the embodiment of the same manner as in FIG. 1. Electromechanical transducer elements 13, 13′, 14, 14′, 15, 15′, 16 and 16′ are fixed near the bottoms of the respective resonant plates. The electromechanical transducer elements are affixed to the resonant plates 8, 8′, 9 and 9′ so that 8 and 8′ which form a pair with each other vibrate in phase, and 9 and 9′ vibrate out of phase. The electromechanical transducer elements are affixed to the resonant plates 10–10′ and 11–11′ so that the mutually paired resonant plates 10 and 10′ vibrate in phase and 11 and 11′ vibrate out of phase.

As has been explained, the complex fork type wave filter of this invention comprises more than a pair of even-numbered resonant plates or more than four plates so that more than a pair of complex forks are formed. Therefore its attenuation characteristic is steep in comparison with that of the conventional single fork. Further, the pass band width can be arbitrarily determined by adjusting the resonant frequency of the paired resonant plates which act as a fork. Still further, the resonant body can be made very small.

What is claimed is:

1. A wave filter of the complex fork type comprising a base, a first pair of resonating plates cantilever mounted to the base to form a vibrating fork tuned to a first preselected frequency, and a second pair of resonating plates cantilever mounted to the base to form a vibrating fork tuned to vibrate with a preselected phase relationship with the first pair of resonating plates, said first and second pair of plates being disposed on opposite faces of said base, said second pair of plates being arrranged intermediate said first pair of plates, said first and second pairs of resonating plates resonating at first and second frequencies sufficiently close to provide a pass band filter having steep attenuating sides, a first pair of electromechanical transducer driving elements electrically coupled in parallel and mechanically affixed to a different resonating plate from said one and second pairs for the inducement of vibrations therein, and a second pair of electromechanical transducer elements electrically coupled in parallel and mechanically affixed to the resonating plates forming vibrating forks with the resonating plates driven by the first pair of transducers, said second pair of transducers detecting the complex wave oscillations of the structure to produce an electrical signal representative thereof.

2. The device as recited in claim 1 wherein said first and second pairs of transducers are affixed to the resonating plates near the fixed end thereof adjacent the base.

References Cited

UNITED STATES PATENTS

| | | | |
|---|---|---|---|
| 3,354,413 | 11/1967 | Ko | 333—72 |
| 3,350,667 | 10/1967 | Shreve | 333—71 |
| 3,290,609 | 12/1966 | Shreve | 330—1 |
| 3,344,367 | 9/1967 | Takahashi | 333—71 |
| 3,464,032 | 8/1969 | Alderman | 333—6 |

HERMAN KARL SAALBACH, Primary Examiner

C. BARAFF, Assistant Examiner

U.S. Cl. X.R.

84—409; 310—8.2, 9.6, 9.8